United States Patent
Ishii et al.

(10) Patent No.: US 7,221,466 B2
(45) Date of Patent: May 22, 2007

(54) IMAGE PROCESSING DEVICE, IMAGE PROCESSING METHOD AND IMAGE FORMING APPARATUS

(75) Inventors: Hiroshi Ishii, Kanagawa (JP); Hiromi Okubo, Kanagawa (JP); Shogo Oneda, Chiba (JP)

(73) Assignee: Ricoh Company, Ltd. (JP)

( * ) Notice: Subject to any disclaimer, the term of this patent is extended or adjusted under 35 U.S.C. 154(b) by 869 days.

(21) Appl. No.: 09/915,360

(22) Filed: Jul. 27, 2001

(65) Prior Publication Data

US 2002/0021455 A1    Feb. 21, 2002

(30) Foreign Application Priority Data

Aug. 9, 2000    (JP)    ............... 2000-241426

(51) Int. Cl.
   *G06F 15/00*    (2006.01)
(52) U.S. Cl. .................. 358/1.15; 358/1.13; 358/1.14; 358/1.16; 382/235; 382/243; 382/245
(58) Field of Classification Search ............... 358/1.15, 358/1.13, 1.14, 1.16; 382/235, 245, 243
   See application file for complete search history.

(56) References Cited

U.S. PATENT DOCUMENTS

| | | |
|---|---|---|
| 4,897,735 A | 1/1990 | Oneda |
| 4,979,129 A | 12/1990 | Okubu |
| 5,111,194 A | 5/1992 | Oneda |
| 5,327,248 A * | 7/1994 | Miller et al. ................ 382/233 |
| 5,392,137 A | 2/1995 | Okubu |
| 5,410,619 A | 4/1995 | Fujisawa et al. |
| 5,473,444 A | 12/1995 | Sakano et al. |
| 5,647,010 A | 7/1997 | Okubo et al. |
| 5,652,803 A | 7/1997 | Tachikawa et al. |
| 5,659,628 A | 8/1997 | Tachikawa et al. |
| 5,734,745 A | 3/1998 | Ohneda |
| 5,751,854 A | 5/1998 | Saitoh et al. |
| 5,781,653 A | 7/1998 | Okubo |
| 5,828,780 A | 10/1998 | Suzuki et al. |
| 5,831,751 A | 11/1998 | Ohneda et al. |
| 5,969,828 A * | 10/1999 | Kawasaki et al. .......... 382/235 |

(Continued)

FOREIGN PATENT DOCUMENTS

JP    11-031052    2/1999

(Continued)

OTHER PUBLICATIONS

Computer translation of Japanese Patent Document No. 11-095944, Tomoki Ishii, Apr. 9, 1999.*

(Continued)

*Primary Examiner*—Twyler Lamb
*Assistant Examiner*—Mark R. Milia
(74) *Attorney, Agent, or Firm*—Dickstein Shapiro LLP

(57) ABSTRACT

A plurality of image production processing parts each of which generates drawing data for image drawing processing from image drawing instructions obtained through data compression. A dividing part which divides the given image drawing instructions into a plurality of sets of image drawing instructions without decompressing them in such a manner that each set of image drawing instructions can be processed by any of the plurality of image producing processing part without referring to any other set of image drawing instructions. A distributing part which distributes the plurality of sets of image drawing instructions to the plurality of image production processing parts.

9 Claims, 5 Drawing Sheets

U.S. PATENT DOCUMENTS

| | | |
|---|---|---|
| 6,005,970 A | 12/1999 | Ohneda et al. |
| 6,041,139 A | 3/2000 | Okubo et al. |
| 6,078,691 A * | 6/2000 | Luttmer ................... 382/235 |
| 6,122,406 A | 9/2000 | Okubo |
| 6,154,569 A * | 11/2000 | Sakaue et al. ............ 382/233 |
| 6,266,440 B1 | 7/2001 | Oneda |
| 6,272,248 B1 | 8/2001 | Saitoh et al. |
| 6,519,052 B1 | 2/2003 | Oneda et al. |
| 6,556,707 B1 | 4/2003 | Yagishita et al. |
| 6,658,156 B1 * | 12/2003 | Aritomi ................... 382/239 |
| 6,714,205 B1 * | 3/2004 | Miyashita et al. ......... 345/536 |
| 6,731,817 B2 | 5/2004 | Shibaki et al. |
| 6,735,740 B2 * | 5/2004 | Sakai et al. ............... 715/526 |
| 6,744,926 B1 * | 6/2004 | Nishigaki ................. 382/239 |
| 6,771,827 B1 * | 8/2004 | Curry ...................... 382/239 |
| 7,061,640 B1 * | 6/2006 | Maeda .................... 358/1.17 |
| 2002/0021455 A1 | 2/2002 | Ishii |
| 2002/0102027 A1 * | 8/2002 | Miyake et al. ............. 382/239 |
| 2002/0140950 A1 | 10/2002 | Ohta |
| 2003/0048356 A1 * | 3/2003 | Kohno et al. .............. 348/143 |
| 2003/0058471 A1 | 3/2003 | Okubo |
| 2003/0128967 A1 * | 7/2003 | Ito et al. ................... 386/68 |
| 2004/0136596 A1 | 7/2004 | Oneda et al. |
| 2004/0146209 A1 | 7/2004 | Kadowaki et al. |
| 2004/0151385 A1 | 8/2004 | Oneda et al. |
| 2004/0163038 A1 | 8/2004 | Yano et al. |
| 2004/0243763 A1 * | 12/2004 | Peters et al. .............. 711/114 |
| 2004/0257622 A1 | 12/2004 | Shibaki et al. |
| 2005/0238334 A1 * | 10/2005 | Inoue et al. .............. 386/125 |

OTHER PUBLICATIONS

"Image Coding Schemes for Hard Copiers" by Kenichiro Oka, Takeshi Agui and Masayuki Nakajima.

* cited by examiner

IMAGE PROCESSING DEVICE, IMAGE PROCESSING METHOD AND IMAGE FORMING APPARATUS

BACKGROUND OF THE INVENTION

1. Field of the Invention

The present invention generally relates to an image processing device for performing image drawing processing according to image drawing instructions given by a host.

2. Description of the Related Art

In the related art, in an image processing device used in a printer or the like, in response to drawing instructions given by a host computer, a CPU interprets the drawing instructions, generates bitmap data to be sent to a printer engine, and stores it in a memory. The image processing device transfers the bitmap data stored in the memory to the printer engine by DMA transfer in accordance with operation of the printer engine, and, thereby, the printer engine prints out relevant image data.

In order to improve the processing speed of the image processing device, Japanese Laid-Open Patent Application No. 11-31052, for example, discloses a document processing system which divides document data into a plurality of sets of first interim data, distributes the respective ones of the plurality of sets of first interim data into a plurality of drawing units which can operate it in parallel, and convert the plurality of sets of first interim data into a plurality of sets of second interim data. Then, a combining unit combines the plurality of sets of second interim data in page unit, so as to generate image data which can be printed out. Thus, high speed processing can be achieved.

However, Japanese Laid-Open Patent Application No. 11-31052 does not discloses a configuration with regard to a case where the interim data is data obtained through data compression. However, image data for a size of A4 in 600 dpi of 8 bits for each color of RGB has a data amount of approximately 100 MB, for example, and, as a result, when this data is transferred from a host computer to a printer without compression, a considerable time is required for the transfer. In order to solve this problem, image data is transferred commonly after being appropriately compressed.

However, if thus-compressed image data is to be processed by the above-mentioned document processing system, the compressed image data should be decompressed first, then be divided into a plurality of sets of drawing instructions and corresponding image data, which are then distributed into the plurality of drawing units. Thus, the plurality of drawing units cannot perform the processing until the decompressing processing is finished, and, thereby, it is not necessarily possible to achieve high-speed image production processing.

SUMMARY OF THE INVENTION

An object of the present invention is to provide an image processing form by which the above-mentioned problems can be solved.

An image processing form according to the present invention includes:

a plurality of image production processing parts each of which generates drawing data for image drawing processing from image drawing instructions obtained through data compression;

a dividing part which divides the given image drawing instructions into a plurality of sets of image drawing instructions without decompressing them in such a manner that each set of image drawing instructions can be processed by any of the plurality of image producing processing part without referring to any other set of image drawing instructions; and a distributing part which distributes the plurality of sets of image drawing instructions to the plurality of image production processing parts.

Thereby, it is possible to divide given image drawing instructions, obtained through data compression, into a plurality of sets of instructions to be performed by the plurality of image production processing parts in parallel, without previously decompressing them. Accordingly, it is possible to hand over the given instructions to the image production processing parts rapidly in a form of divisions of image drawing instructions which can be directly processed by the image production processing parts in parallel. Thus, it is possible to achieve high-speed image processing for providing drawing data used for forming a printed image, for example.

Image data corresponding to the image drawing instructions to be processed may comprise image data obtained through data compression such that the image data comprises a plurality of data blocks and each data block can be decompressed without referring to any other data block.

Thereby, even in a case where image data to be processed is image data obtained through data compression such that decompression of each line of image data needs another line thereof, it is possible to easily divide the given image data into a plurality of sets of image drawing instructions which can be processed by the plurality of image production processing parts in parallel without previously decompressing it, as long as the division is made such that a division unit is a multiple of a number of lines included in each data block. Thus, it is possible to apply the present invention to image data obtained by various data compressing methods.

Other objects and further features of the present invention will become more apparent from the following detailed description when read in conjunction with the accompanying drawings.

DETAILED DESCRIPTION OF THE PREFERRED EMBODIMENT

FIGS. 1 through 5 illustrate one embodiment of the present invention.

Figure 1:
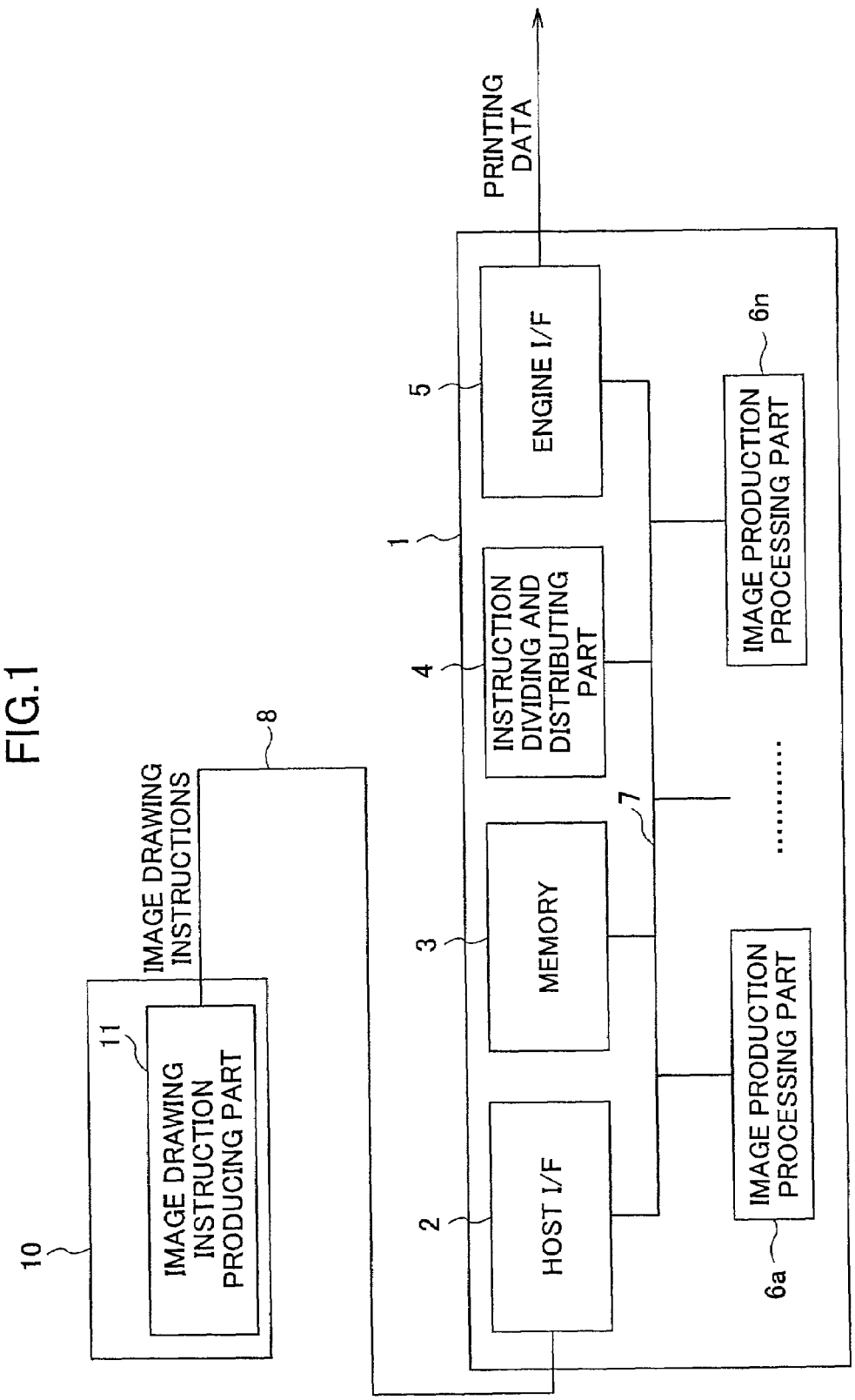
FIG. 1 shows a block diagram of a general configuration of an image processing device in an embodiment of the present invention.

FIG. 1 shows a block diagram illustrating a general configuration of an image processing device 1 in one embodiment of the present invention.

As shown in FIG. 1, the image processing device 1 includes a host I/F (interface) 2, a memory 3, an instruction dividing and distributing part 4, an engine I/F 5, and a plurality of image production processing parts 6a through 6n. The respective parts are mutually connected by a bus 7. This image processing device 1 may be used in an image forming apparatus such as a printer or the like.

To the host I/F, a host apparatus 10 such as a host computer is connected through a communication circuit 8 such as a network or a serial circuit. The host apparatus 10 produces image drawing instructions by using an image drawing instruction producing part 11 based on instructions given by a user, and transmits the thus-produced instructions to a printer or the like which employs the above-mentioned image processing device 1. In this occasion, the image drawing instruction producing part 11 of the host apparatus 10 compresses an image object by a predetermined compressing method such as a fixed length compressing method, and, then, transmits it to the printer or the like.

The host I/F 2 receives the image drawing instructions transmitted from the host apparatus 10 through the communication circuit 8, and writes them into the memory 3.

The memory 3 includes a RAM (Random Access Memory) or the like, and, stores therein the received image drawing instructions and other various data.

The instruction dividing and distributing part 4 reads the image drawing instructions from the memory 3, analyses the read image drawing instructions, determines whether to process these instructions separately after dividing into a plurality of sets of instructions or to process them collectively without dividing into a plurality of sets of instructions, and transfers the image drawing instructions to the plurality of image production processing parts 6a through 6n after dividing them or not dividing them accordingly.

Figure 2:
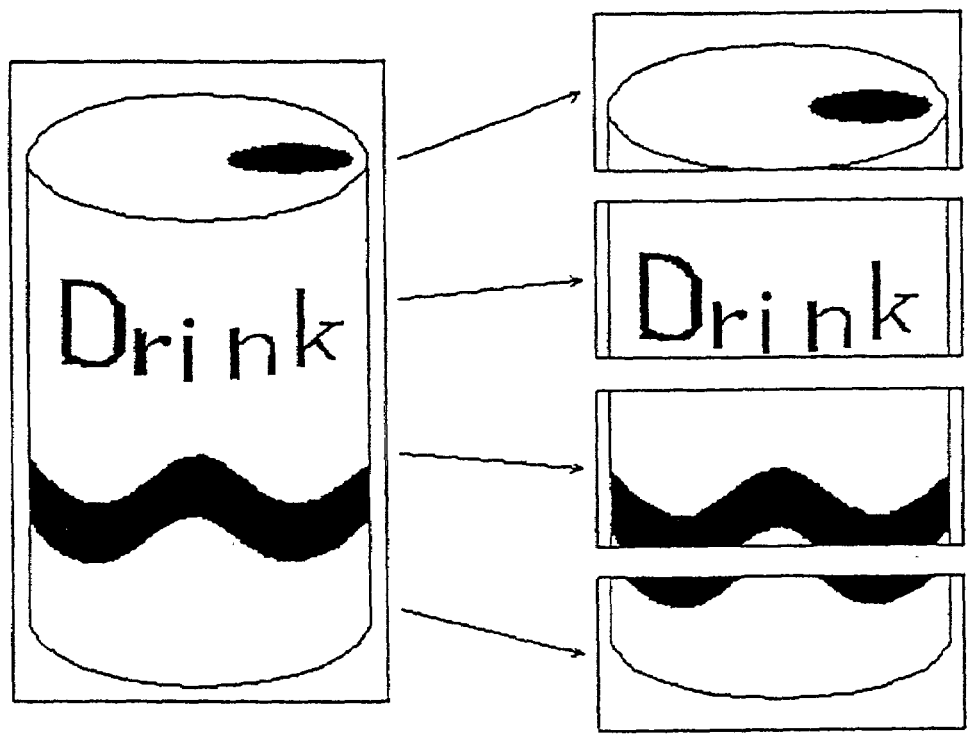
FIG. 2 illustrates operation of dividing given image data (image drawing instructions)

Specifically, when the image drawing instructions read from the memory 3 are instructions for processing concerning an image object, and, an area to be processed or a data amount of the corresponding image object is larger than a predetermined reference value, the given image drawing instructions are divided into a plurality of sets of image drawing instructions as shown in FIG. 2, and the thus-divided sets of image drawing instructions are then distributed into the respective image production processing parts 6a through 6n, which then process the divided image drawing instructions and process them, respectively, separately.

However, when the image drawing instructions read from the memory 3 are instructions for processing concerning an image object, but, an area to be processed or a data amount of the corresponding image object is not larger than the predetermined reference value, the image drawing instructions are not divided into a plurality of sets of image drawing instructions, and the image drawing instructions are transferred to the respective image production processing parts 6a through 6n (or an appropriate one thereof) as they are.

Figure 3:
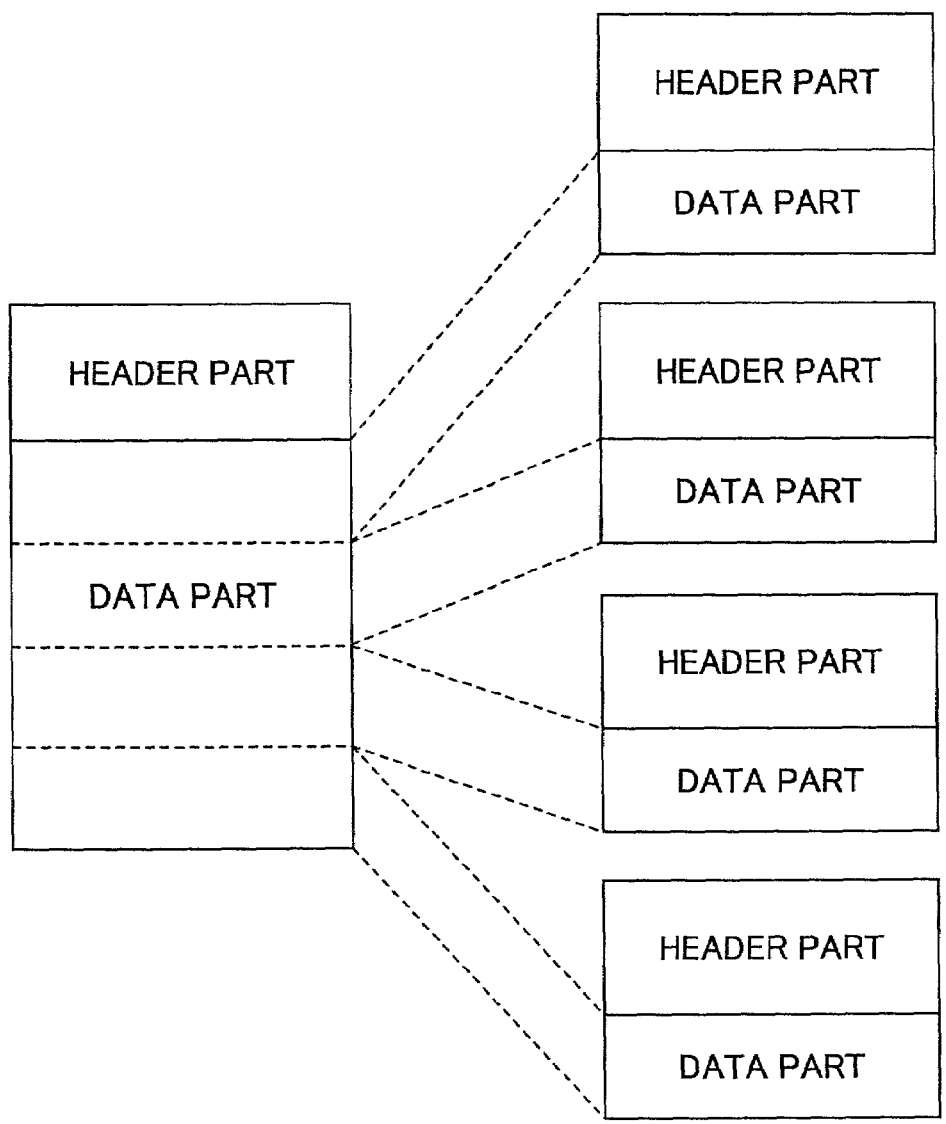
FIG. 3 illustrates operation of dividing given image drawing instructions into four sets of image drawing instructions, corresponding to the four regions of image shown in FIG. 2, performed by the image processing device shown in FIG. 1.

As the image object is one transmitted after being compressed by the host apparatus 10 by the fixed length compressing method, for example, the instruction dividing and distributing part 4 can easily calculate a position at which image data corresponding to each region obtained through the division (see FIG. 2) is located in the image drawing instructions. As shown in FIG. 3, it is easy to produce image objects corresponding to the respective image drawing instructions obtained through the division.

Then, the image production processing parts 6a through 6n analyze the image drawing instructions given by the instruction dividing and distributing part 4, generate bitmap data (drawing data) which can be directly transferred to and processed by a printer engine (not shown in the figure), and transmit it to the printer engine through the engine I/F 5.

The engine I/F 5 to which the printer engine is connected performs communication of the bitmap data from the image production processing parts 6a through 6n to the printer engine, a control signal from the instruction dividing and distributing part 4 to the printer engine, a status signal from the printer engine to another part, and so forth.

Figure 5:
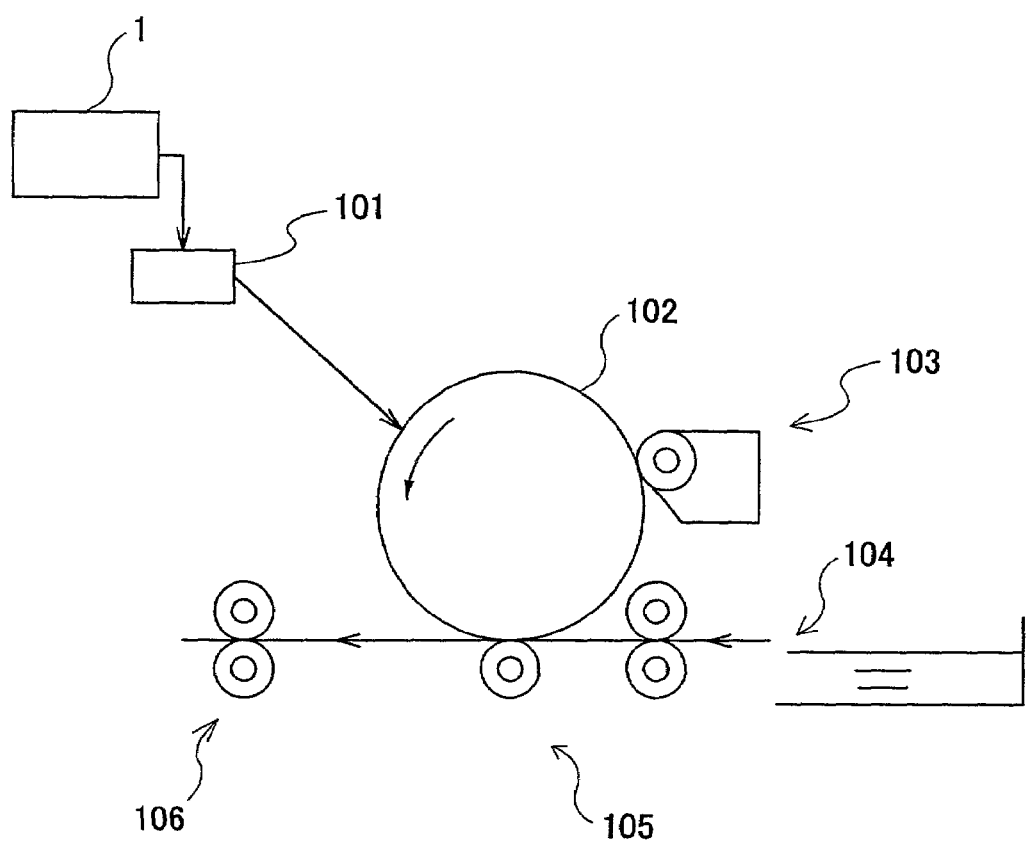
FIG. 5 illustrates an image forming apparatus which employs the image processing device shown in FIG. 1.

FIG. 5 shows one example of the printer engine of the image forming apparatus employing the above-described image processing device 1.

The printer engine performs image formation (printing processing) by a predetermined form such as an electrophotographic form according to the drawing data (bitmap data) and control signal. For this purpose, the printer engine includes, in the case of the electrophotographic form, necessary components (not shown in the figure) for printing an image onto a recording paper based on the drawing data such as a photosensitive body 102, an optical writing unit 101, a development unit 103, a charging unit (not shown in the figure), a clearing unit (not shown in the figure) and so forth.

There, the optical writing unit 101 is operated according to the drawing data and control signal, an electrostatic latent image is thereby formed on the photosensitive body 102, and the development unit 103 develops the latent image by supplying a toner onto the photosensitive body 102 so as to form a toner image thereon. Then, the printer engine feeds a recording paper from a paper feeding unit 104 between the photosensitive body 102 and a transfer unit 105, transfers the toner image on the photosensitive body 102 onto the recording paper, conveys the recording paper having the toner image transferred thereonto to a fixing part 106, which then fixes the toner image onto the recording paper. Thus, the image is printed.

Figure 4:
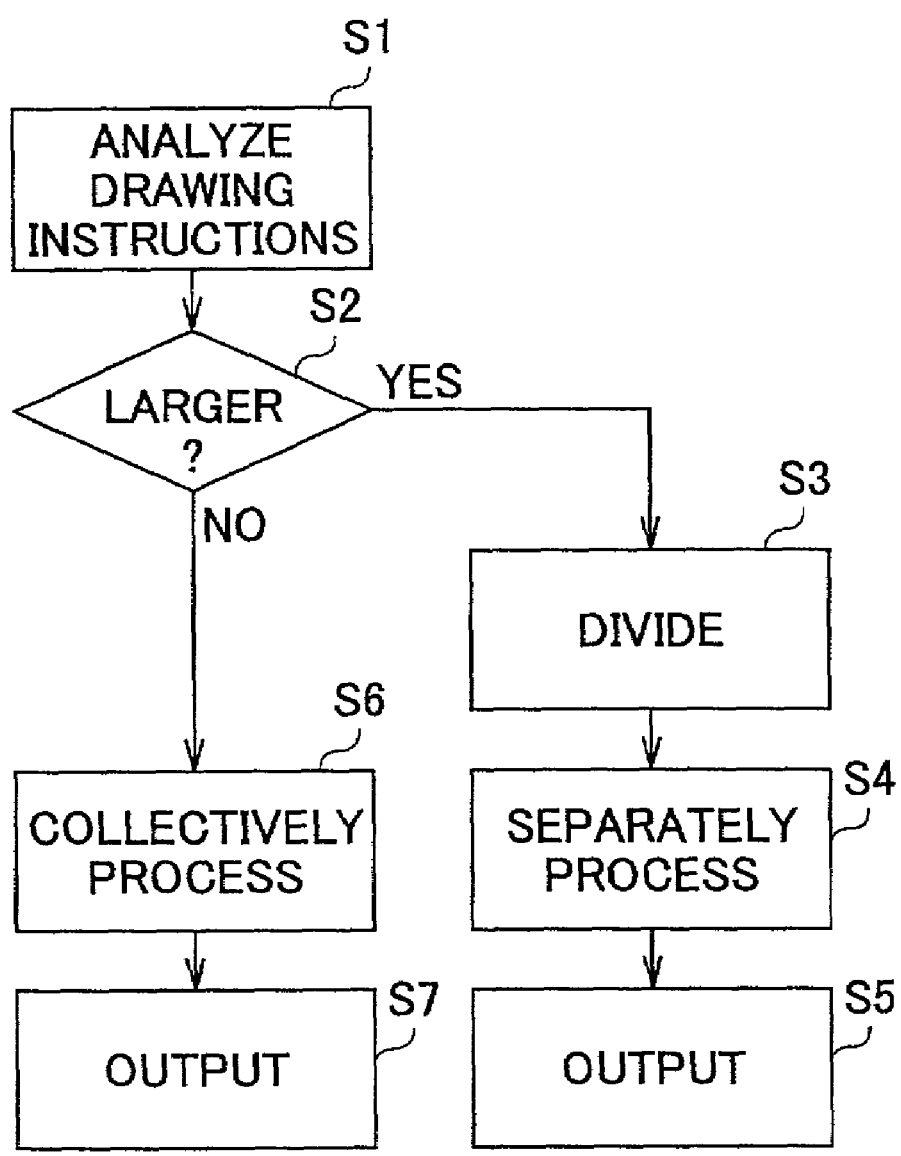
FIG. 4 shows a flow chart performed by the image processing device shown in FIG. 1.

Functions of the above-described image processing device 1 will now be described, with reference to FIG. 4.

As described above, the image processing device 1 analyses image drawing instructions given by the host apparatus 10 (in a step S1), determines (in a step S2) whether to causes the image production processing parts 6a through 6n to perform them separately after dividing the image drawing instructions into a plurality of sets of image drawing instructions, or to cause the image production processing parts 6a through 6n (or an appropriate one thereof) to perform them collectively without dividing the image drawing instructions into a plurality of sets of image drawing instructions. Thus, high-speed image drawing processing can be achieved.

Specifically, the host apparatus 10, based on instructions by a user, produces image drawing instructions through the image drawing instruction producing part 11, and transmits them to the printer which employs the image processing device 1. In this occasion, the image drawing instruction producing part 11 of the host apparatus 10 compresses an image object by a predetermined compressing method such as a fixed length compressing method, and, then, transmits it to the printer or the like.

The host I/F 2 of the image processing device 1 receives the image drawing instructions transmitted from the host apparatus 10 through the communication circuit 8, and writes them into the memory 3. The instruction dividing and distributing part 4 reads the image drawing instructions from the memory 3, analyses the read image drawing instructions (in the step S1), determines (in the step S2) whether to process (in a step S4) these instructions separately after dividing (in a step S3) into a plurality of sets of instructions or to process (in a step S6) them collectively without dividing into a plurality of sets of instructions, and transfers the image drawing instructions to the plurality of image production processing parts 6a through 6n, which then generate bitmap data which is drawing data.

Specifically, the instruction dividing and distributing part 4 determines (in the step S2) whether or not the image drawing instructions read from the memory 3 are instructions for image processing concerning an image object, and, an area to be processed or a data amount of the corresponding image object is larger than the predetermined reference value. When the image drawing instructions read from the memory 3 are instructions for processing concerning an image object, and, an area to be processed or a data amount of the corresponding image object is larger than the predetermined reference value (Yes in the step S2), the image drawing instructions are divided into four sets of image data corresponding to the given image drawing instructions as shown in FIG. 2 (in the step S3), and the thus-divided image drawing instructions are then distributed into the respective image production processing parts 6a through 6n, which then process the divided sets of image drawing instructions (image data), respectively.

As the image object is one transmitted after being compressed by the host apparatus 10 by the fixed length compressing method, for example, as mentioned above, the instruction dividing and distributing part 4 can easily calculate a position at which image data corresponding to each region obtained through the division is located in the image drawing instructions. Accordingly, as shown in FIG. 3, it is easy to produce image objects corresponding to the respective sets of image drawing instructions (image data) obtained through the division. Specifically, as shown in FIG. 3, the data part of the received image drawing instructions is divided into a plurality of data parts, while the header part of the received image drawing instructions is used for each of the thus-obtained plurality of data parts. Thus, it is easy to produce the plurality of sets of image drawing instructions.

For example, assuming that relevant image data (image drawing instructions) is such that each dot of gray scale is expressed by 1 byte, in a case where the image data has been compressed by a fixed length compressing method such that the thus-compressed image data can be decompressed while each line of the image data does not need any other lines of the image data for decompression, data at the left end (0, y) on any line y is located at a position obtained by an address expressed by the following formula:

$$\text{Head} + y \times \text{Width} \times \text{Ratio (bytes)}$$

where:
 x denotes x coordinate (dots);
 y denotes y coordinate (dots);
 'Head' denotes the size of the header part (bytes);
 'Width' denotes the lateral width of the image (dots/pixels);
 'Height' denotes the height of the image (dots/pixels);
 'Ratio' denotes the compression rate of the data part other than the header part;
 the image data is arranged in the following order:
  (0,0), (1,0), . . . , (Width–1,0), (0,1), . . . , (Width–1, Height–1)
and;
 Width×Ratio is an integer.

Such a method of fixed length compression is disclosed by Kenichiro Oka, Takeshi Agui and Masayuki Nakajima, in an article titled 'Image Coding Schemes for Hard Copies' of a journal of Japan Printing Society, Vol. 27, No. 3, 1990, item 2.5, 'Proposal of GBTC (Generalized Block Truncation Coding)', for example.

In this example, bit data of 8 bits for each color of R, G and B for each pixel comes to be expressed by 72 bits for one block of 4×4 pixels. As the data amount before the compression is 8×3×4×4=384 bits, the compression ratio (Ratio) is 72/384. In this case, assuming that coordinate is counted from 0, data at the coordinate (0, y) is present at a location at the following address:

$$\text{Head} + (y \times \text{Width}) \times (72/384)$$

where it is assumed that each of y and Width is a multiple of 4.

The respective image production processing part 6a through 6n analyze the divided sets of image drawing instructions given by the instruction driving and distributing part 4, generate bitmap data which can be processed by the printer engine, and transfers (in a step S5) it to the printer engine through the engine I/F 5.

The printer engine performs image formation by a predetermined form such as an electrophotography form, as described above, according to the drawing data (bitmap data) and control signal given by the image processing device 1.

When the image drawing instructions read from the memory 3 are instructions for processing concerning an image object, but, an area to be processed or a data amount of the corresponding image object is not larger than the predetermined reference value (No of the step S2), the image drawing instructions are not divided, and the image drawing instructions are given to the image production processing parts 6a through 6n (or an appropriate one thereof) as they are.

The respective image production processing part 6a through 6n (or the appropriate one) analyze the not divided image drawing instructions given by the instruction driving and distributing part 4, generate bitmap data which can be processed by the printer engine (in the step s6), and transfers it to the printer engine through the engine I/F 5 (in a step S7). The printer engine performs image formation by the predetermined form such as an electrophotography form according to the drawing data (bitmap data) and control signal given by the image processing device 1.

In the above-described embodiment, the image data which is obtained through a fixed length compressing method such that decompression can be performed without need of any other line of image data. However, similarly, the present invention may also be applied to image data which is obtained through a data compressing method other than the fixed length compressing method.

For example, with regard to image data obtained through a variable length compressing method, it is possible to easily divide given image drawing instructions into a plurality of sets of image drawing instructions, each set of which can be decompressed without referring to any other set thereof, by holding a table by which, for partial coordinates of image, it is possible to know addresses at which pixel values corresponding to the coordinates are present.

For example, image data expressed in a manner such that each pixel along the gray scale is expressed by 1 byte is indicated by a pair of a pixel value of 1 byte and a pixel continuation number of 1 byte. Then, it is assumed that this image data is compressed by a run-length compression method (variable length compression method). It is assumed that the pixel continuation number is calculated independently for each line. In this case, for example, the following image data of 12×4 pixels in hexadecimal notation:

7F, 7F, 7F, 7F, 80, 80, 80, 81, 80, 80, 7E, 7E
7E, 7F, 7F, 80, 80, 80, 81, 81, 81, 80, 80, 80
7E, 7F, 7F, 80, 80, 81, 82, 82, 82, 80, 80, 80
7F, 7F, 7F, 7F, 80, 80, 82, 82, 82, 82, 81, 81 is compressed into the following data rows in hexadecimal notation:

7F, 04, 80, 03, 81, 01, 80, 02, 7E, 02
7E, 01, 7F, 02, 80, 03, 81, 03, 80, 03
7E, 01, 7F, 02, 80, 02, 81, 01, 82, 03, 80, 03
7F, 04, 80, 02, 82, 04, 81, 02

In this occasion, it is possible to properly divide the data on the compressed state in line units easily, by having the following table as the header part:

line:address
0:0
1:10
2:20
3:32 where the value of the address means the address of the image data at which the pixel value of the first pixel on the line is present.

Further, with regard to image data obtained through a compressing method such as MR coding such that two lines or four lines are regarded as one data block, and each data block can be decompressed without referring to any other data block, it is possible to easily divide given image drawing instructions into a plurality of sets of image drawing instructions, each set of which can be decompressed without referring to any other set thereof, by performing the division in a manner such that the unit of division includes a number of lines which is a multiple of two or four accordingly.

Thus, according to the image processing device 1 in the embodiment of the present invention, the instruction dividing and distributing part 4 analyzes given image drawing instructions obtained through data compression by a predetermined compressing method, divides image data corresponding to the image drawing instructions into a plurality sets of image drawing instructions, and distributes them to the plurality of image production processing parts 6a through 6n, which then generate drawing data for drawing processing from the image data corresponding to the image drawing instructions according to the plurality sets of image drawing instructions, respectively. In this occasion, the instruction dividing and distributing part 4 divides the given image drawing instructions into the plurality of sets of image drawing instructions without previously decompressing them, each set of image drawing instructions can be decompressed without referring to any other set of image drawing instructions.

Accordingly, compressed image data corresponding to given image drawing instructions is divided into a plurality of sets of image data without previously decompressing it. Thus, it is possible to achieve high-speed image processing with a reduced cost.

In this occasion, assuming that image data to be processed is image data obtained through data compression by a compressing method such that the image data includes a plurality of data blocks, and each block can be decompressed without referring to any other data block, the image data can be easily divided into divisions of image drawing instructions without decompressing it in a manner such that each division of image drawing instructions can be interpreted without referring to any other division of image drawing instructions. In this occasion, the image data may be divided by a border between data blocks.

Further, by employing a fixed length compression method as mentioned above, it is very easy to divide image data of given image drawing instructions into divisions which can be processed by a plurality of image production processing parts as they are in parallel. Accordingly, it is possible to further improve the image processing speed and reduce the costs therefor.

Further, in the embodiment shown in FIG. 1, it is possible that a given set of image drawing instructions is divided into a number of divisions which is equal to or less than the number of image production processing parts which are on standby without performing image production processing.

Further, the present invention is not limited to the above-described embodiments, and variations and modifications may be made without departing from the scope of the present invention.

The present application is based on Japanese priority application No. 2000-241426, filed on Aug. 9, 2000, the entire contents of which are hereby incorporated by reference.

What is claimed is:

1. An image processing device comprising:
a dividing part which divides compressed image drawing instructions into a plurality of sets of compressed image drawing instructions without decompressing them in such a manner that each set of image drawing instructions can be processed without referring to any other set of image drawing instructions;
a distributing part which distributes the plurality of sets of image drawing instructions to a plurality of image production processing parts; and
said plurality of image production processing parts each of which generates drawing data for image drawing processing from the plurality of sets of image drawing instructions,
wherein the instruction dividing and distributing parts analyze whether or not the image drawing instructions transmitted from the host apparatus are those concerning an image object, and also, an area to be processed or a data amount of the image object is larger than a predetermined reference value, and, when the conditions are met, the compressed image drawing instructions are divided into a plurality of compressed image drawing instructions, and the divided image drawing instructions are distributed into the respective image production processing parts for processing the same, respectively, while, when the conditions are not met, the compressed image drawing instructions are not divided, and are transferred to the image production processing parts as they are.

2. The image processing device as claimed in claim 1, wherein image data corresponding to the given image drawing instructions to be processed here comprises image data obtained through data compression such that the resulting image data comprises a plurality of data blocks and each data block can be decompressed without referring to any other data block.

3. The image processing device as claimed in claim 2, wherein said dividing part divides given image data by a border between data blocks.

4. The image processing device as claimed in claim 1, wherein image data corresponding to the given image drawing instructions comprises image data obtained through data compression by a fixed length compressing method.

5. An image processing method comprising the steps of:
a) dividing compressed image drawing instructions into a plurality of sets of compressed image drawing instructions without decompressing them in such a manner that each set of image drawing instructions can be processed without referring to any other set of image drawing instructions; and
b) generating drawing data for image drawing processing from the plurality of sets of image drawing instructions,
wherein the dividing step and a distributing step analyze whether or not the image drawing instructions transmitted from the host apparatus are those concerning an image object, and also, an area to be processed or a data amount of the image object is larger than a predetermined reference value, and, when the conditions are met, the compressed image drawing instructions are divided into a plurality of compressed image drawing instructions, and the divided image drawing instructions are distributed into the respective image producing processing for processing the same, respectively, while, when the conditions are not met, the compressed image drawing instructions are not divided, and are transferred to image producing processing as they are.

6. The method as claimed in claim 5, wherein image data corresponding to the given image drawing instructions to be processed comprises image data obtained through data compression such that the resulting image data comprises a plurality of data blocks and each data block can be decompressed without referring to any other data block.

7. The method as claimed in claim 6, wherein said step b) divides the given image data by a border between data blocks.

8. The method as claimed in claim 5, wherein image data corresponding to the given image drawing instructions comprises image data obtained through data compression by a fixed length compressing method.

9. An image forming apparatus comprising:
a dividing part which divides compressed image drawing instructions into a plurality of sets of compressed image drawing instructions without decompressing them in such a manner that each set of image drawing instructions can be processed without referring to any other set of image drawing instructions;
a distributing part which distributes the plurality of sets of image drawing instructions to a plurality of image production processing parts;
said plurality of image production processing parts each of which generates drawing data for image drawing processing from a set of image drawing instructions; and
a drawing processing part which performs drawing processing according to the drawing data given by said plurality of image production processing parts, and thus forms an image,
wherein the instruction dividing and distributing parts analyze whether or not the image drawing instructions transmitted from the host apparatus are those concerning an image object, and also, an area to be processed or a data amount of the image object is larger than a predetermined reference value, and, when the conditions are met, the compressed image drawing instructions are divided into a plurality of compressed image drawing instructions, and the divided image drawing instructions are distributed into the respective image production processing parts for processing the same, respectively, while, when the conditions are not met, the compressed image drawing instructions are not divided, and are transferred to the image production processing parts as they are.

* * * * *